US009027339B2

(12) United States Patent
Morimoto et al.

(10) Patent No.: US 9,027,339 B2
(45) Date of Patent: May 12, 2015

(54) THERMO-MAGNETIC ENGINE APPARATUS AND REVERSIBLE THERMO-MAGNETIC CYCLE APPARATUS

(75) Inventors: Tsuyoshi Morimoto, Obu (JP); Naoki Watanabe, Kariya (JP); Shinichi Yatsuzuka, Nagoya (JP); Kazutoshi Nishizawa, Toyoake (JP)

(73) Assignee: Denso Corporation, Kariya (JP)

( * ) Notice: Subject to any disclaimer, the term of this patent is extended or adjusted under 35 U.S.C. 154(b) by 251 days.

(21) Appl. No.: 13/450,649

(22) Filed: Apr. 19, 2012

(65) Prior Publication Data

US 2012/0266591 A1  Oct. 25, 2012

(30) Foreign Application Priority Data

Apr. 25, 2011 (JP) ................................. 2011-097115

(51) Int. Cl.
*F01D 1/00* (2006.01)
*F03G 7/00* (2006.01)
*F25B 21/00* (2006.01)

(52) U.S. Cl.
CPC . *F03G 7/00* (2013.01); *F25B 21/00* (2013.01); *F25B 2321/0022* (2013.01); *Y02B 30/66* (2013.01)

(58) Field of Classification Search
CPC .......... F25B 21/00; F25B 21/02; F25B 21/04; F01D 1/00
USPC .............................. 60/645–681, 527; 310/306
See application file for complete search history.

(56) References Cited

U.S. PATENT DOCUMENTS

| 2,820,348 | A |   | 1/1958  | Sauter |
|-----------|---|---|---------|--------|
| 3,121,265 | A | * | 2/1964  | Hoh .................................. 49/25 |
| 3,238,396 | A | * | 3/1966  | Schubring et al. ............ 310/306 |
| 3,743,866 | A | * | 7/1973  | Pirc ............................... 310/306 |
| 4,447,736 | A | * | 5/1984  | Katayama ...................... 290/1 R |
| 5,656,922 | A |   | 8/1997  | LaVelle et al. |
| 6,588,216 | B1| * | 7/2003  | Ghoshal ........................... 62/3.1 |
| 7,603,865 | B2|   | 10/2009 | Shin et al. |
| 8,304,957 | B2| * | 11/2012 | Russberg et al. ............. 310/306 |
| 8,418,476 | B2| * | 4/2013  | Heitzler et al. ................... 62/3.1 |

(Continued)

FOREIGN PATENT DOCUMENTS

EP      2108904 A1 * 10/2009  ....................... 62/3.1
FR      2933539         1/2010

(Continued)

OTHER PUBLICATIONS

U.S. Appl. No. 13/450,622, filed Apr. 19, 2012, Morimoto et al.

(Continued)

*Primary Examiner* — Thomas Denion
*Assistant Examiner* — Shafiq Mian
(74) *Attorney, Agent, or Firm* — Harness, Dickey & Pierce, PLC

(57) ABSTRACT

A thermo-magnetic engine apparatus includes a magnetic element having a high temperature end to which hot energy is supplied and a low temperature end to which cold energy is supplied, a magnetic-field applier device, and a power source device. Curie temperature of the magnetic element is set between a temperature of the high temperature end and a temperature of the low temperature end. The power source device gains a magnetic power generated between the magnetic element and the magnetic-field applier device as kinetic energy.

14 Claims, 7 Drawing Sheets

(56) References Cited

U.S. PATENT DOCUMENTS

| | | | |
|---|---|---|---|
| 8,596,077 B2* | 12/2013 | Muller et al. .................... 62/3.1 |
| 8,754,569 B2* | 6/2014 | Kuo et al. ...................... 310/306 |
| 2002/0185935 A1 | 12/2002 | Yamamoto et al. |
| 2006/0218936 A1* | 10/2006 | Kobayashi et al. ............... 62/3.1 |
| 2008/0078184 A1* | 4/2008 | Saito et al. ........................ 62/3.1 |
| 2008/0128012 A1* | 6/2008 | Schick et al. .................. 136/201 |
| 2008/0223853 A1* | 9/2008 | Muller et al. .................. 219/672 |
| 2008/0236172 A1* | 10/2008 | Muller et al. ..................... 62/3.1 |
| 2009/0070001 A1 | 3/2009 | Takakura et al. |
| 2009/0217675 A1* | 9/2009 | Kobayashi et al. ............... 62/3.1 |
| 2009/0308080 A1 | 12/2009 | Han et al. |
| 2009/0320499 A1 | 12/2009 | Muller et al. |
| 2011/0104530 A1 | 5/2011 | Muller et al. |
| 2011/0215088 A1 | 9/2011 | Muller et al. |
| 2012/0031107 A1* | 2/2012 | Heitzler et al. .................. 62/3.1 |
| 2012/0060512 A1* | 3/2012 | Vetrovec ........................... 62/3.1 |
| 2012/0060513 A1* | 3/2012 | Vetrovec ........................... 62/3.1 |
| 2012/0266607 A1* | 10/2012 | Morimoto et al. ................ 62/3.1 |
| 2013/0258593 A1* | 10/2013 | Kuo et al. ...................... 361/699 |
| 2013/0319012 A1 | 12/2013 | Kuo et al. |

FOREIGN PATENT DOCUMENTS

| | | |
|---|---|---|
| FR | 2936363 | 3/2010 |
| JP | 9-68968 | 3/1997 |
| JP | 2000-104655 | 4/2000 |
| JP | 2001-289045 | 10/2001 |
| JP | A-2002-281774 | 9/2002 |
| JP | 2003-69101 | 3/2003 |
| JP | 2006-34081 | 2/2006 |
| JP | B2-4234235 | 3/2009 |
| JP | 2009281685 A * | 12/2009 |
| JP | 2010-112606 | 5/2010 |
| WO | WO 2010/004131 | 1/2010 |
| WO | WO 2010/061064 | 6/2010 |
| WO | WO2012-102016 | 8/2012 |

OTHER PUBLICATIONS

Office Action issued Apr. 21, 2014 in co-pending U.S. Appl. No. 13/450,622.
Okumara, T. et al., International Journal of Refrigeration 29 (2006); pp. 1327-1331.
I-Car Advantage Online; http://www.i-car.com/pdf/advantage/online/2006/053006.pdf.
Autoshop101, Section 6, Body Electrical, Toyota Hybrid System—Course 071; pp. 6.1-6.16; http://www.autoshop101.com.
Toyota Prius 2004 2nd Generation, Emergency Response Guide; pp. 1-26; https://techinfo.toyota.com/techInfoPortal/resources/jsp/siviewer/index.jsp?href=erg/T-ERG-005-D/xhtml/T-ERG-005-D.html&locale=en&openSource=TechinfoPrelogin.

* cited by examiner

THERMO-MAGNETIC ENGINE APPARATUS AND REVERSIBLE THERMO-MAGNETIC CYCLE APPARATUS

CROSS REFERENCE TO RELATED APPLICATION

This application is based on Japanese Patent Application No. 2011-97115 filed on Apr. 25, 2011, the disclosure of which is incorporated herein by reference in its entirety.

TECHNICAL FIELD

The present disclosure relates to a thermo-magnetic engine apparatus and a reversible thermo-magnetic cycle apparatus.

BACKGROUND

JP-B2-4234235 and JP-A-2002-281774 describe a thermo-magnetic engine using temperature characteristics of a magnetic substance. In the engine, a magnetic field is applied to a cylindrical body so as to define a high-temperature part and a low-temperature part front and behind the cylindrical body in a rotation direction so that the cylindrical body is rotated.

However, when the cylindrical body is rotated, the high-temperature part and the low-temperature part move, so that thermal efficiency of the engine is low.

SUMMARY

It is an object of the present disclosure to provide a thermo-magnetic engine apparatus having high efficiency.

Further, it is an object of the present disclosure to provide a reversible thermo-magnetic cycle apparatus which can be used as a thermo-magnetic engine apparatus or a magneto-caloric effect type heat pump apparatus by switching.

According to a first example of the present disclosure, a thermo-magnetic engine apparatus includes a magnetic element, a pump, a magnetic-field applier device and a power source device. The magnetic element has a high temperature end to which hot energy is supplied and a low temperature end to which cold energy is supplied. Curie temperature of the magnetic element is set between a temperature of the high temperature end and a temperature of the low temperature end. A magnetism of the magnetic element decreases when a temperature of the magnetic element is equal to or higher than the Curie temperature and increases when the temperature of the magnetic element is lower than the Curie temperature. The pump pumps heat transport medium toward the low temperature end from the high temperature end when the magnetic element is heated and pumps heat transport medium toward the high temperature end from the low temperature end when the magnetic element is cooled. The magnetic-field applier device applies an external magnetic field to the magnetic element. The power source device gains a magnetic power generated between the magnetic element and the magnetic-field applier device as kinetic energy.

Accordingly, the kinetic energy can be efficiently provided by the thermo-magnetic engine apparatus.

According to a second example of the present disclosure, a reversible thermo-magnetic cycle apparatus is selectively used as the thermo-magnetic engine apparatus or a magneto-caloric effect type heat pump apparatus which supplies heat of a heat source to a thermal load. When the reversible thermo-magnetic cycle apparatus is used as the magneto-caloric effect type heat pump apparatus, the magnetic element generates heat when an external magnetic field is applied to and absorbs heat when the external magnetic field is removed from as a magneto-caloric element. Further, the power source device switches the applying and the removal of the external magnetic field from each other by making the magneto-caloric element and the magnetic-field applier device to have a relative movement as a magnetic field switcher. Further, the pump pumps heat transport medium to flow from the low-temperature end toward the high-temperature end when the external magnetic field is applied to the magneto-caloric element and pumps heat transport medium to flow from the high-temperature end toward the low-temperature end when the external magnetic field is removed from the magneto-caloric element as a pump device.

Accordingly, the reversible thermo-magnetic cycle apparatus can be used as both of the thermo-magnetic engine apparatus and the magneto-caloric effect type heat pump apparatus by the switching.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
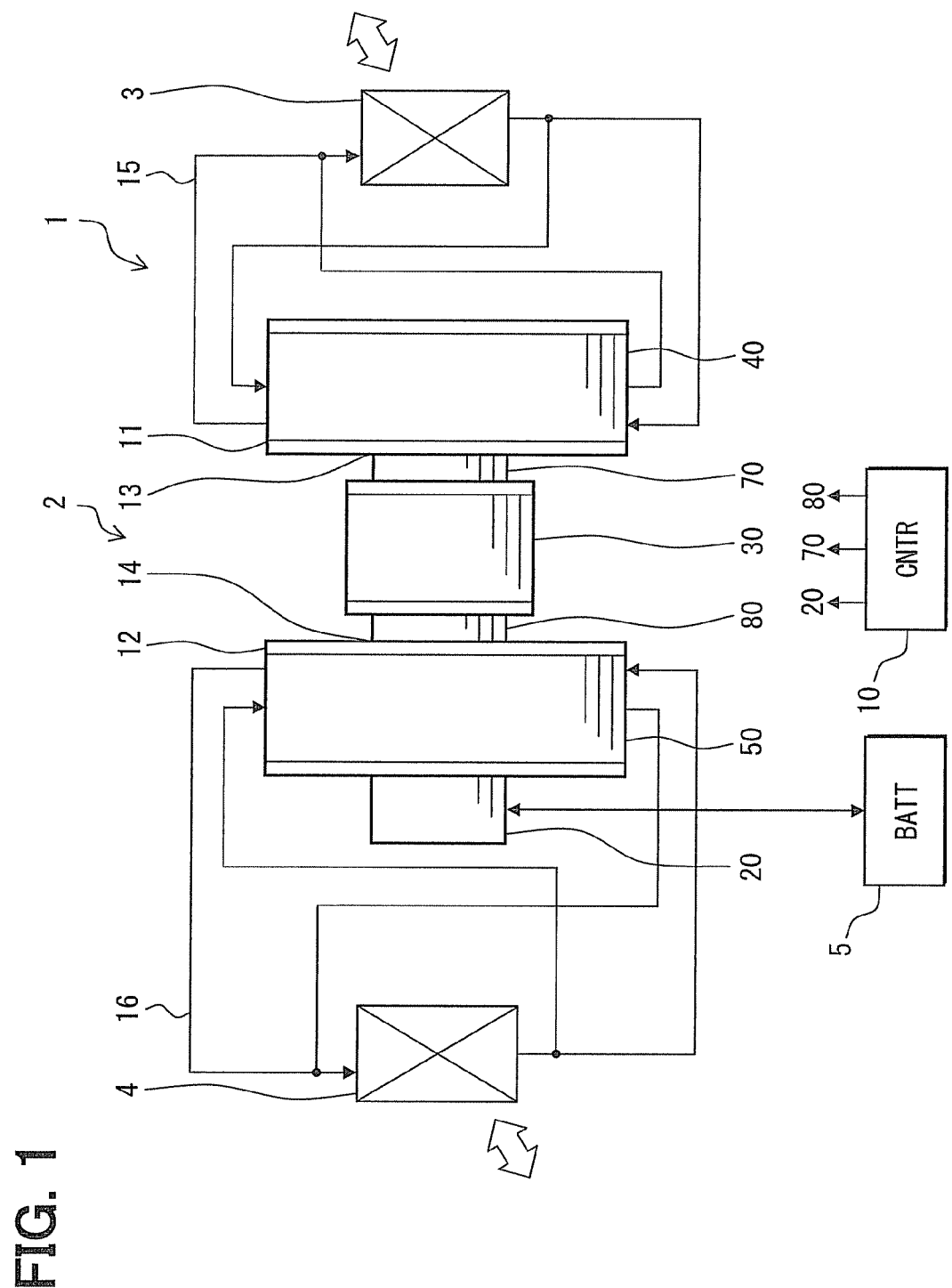
FIG. 1 is a schematic view illustrating an air-conditioner including a reversible thermo-magnetic cycle apparatus according to a first embodiment.

Embodiments of the present invention will be described hereafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

(First Embodiment)

As shown in FIG. 1, a reversible thermo-magnetic cycle apparatus 2 according to a first embodiment is applied to an air-conditioner 1 of a vehicle. The air-conditioner 1 conditions a temperature of air in a passenger compartment of the vehicle. The air-conditioner 1 has an indoor heat exchanger 3 arranged in the vehicle, and heat is exchanged in the indoor heat exchanger 3 with inside air. The indoor heat exchanger 3 may correspond to a high-temperature heat exchanger. The air-conditioner 1 further has an outdoor heat exchanger 4 arranged outside of the vehicle, and heat is exchanged in the outdoor heat exchanger 4 with outside air. The outdoor heat exchanger 4 may correspond to a low-temperature heat exchanger.

The air-conditioner 1 includes the reversible thermo-magnetic (RTM) cycle apparatus 2. Hereinafter, the reversible thermo-magnetic cycle apparatus 2 may be referred as RTM apparatus 2. The RTM apparatus 2 may work as a thermo-magnetic engine (TME) apparatus using magnetism-temperature characteristics of a magneto-caloric element. Hereinafter, the thermo-magnetic engine apparatus 2 may be referred as TME apparatus 2. The RTM apparatus 2 may work as a magneto-caloric effect type heat pump (MHP) apparatus using magneto-caloric effect of a magneto-caloric element. Hereinafter, the magneto-caloric effect type heat pump apparatus 2 may be referred as MHP apparatus 2. The RTM apparatus 2 can be selectively operated as the TME apparatus or the MHP apparatus.

In this specification, the word of the heat pump apparatus is used in a broad sense. That is, the word of the heat pump apparatus includes both of a heat pump apparatus using cold energy and a heat pump apparatus using hot energy. The heat pump apparatus using cold energy may correspond to a refrigerating cycle apparatus. The word of the heat pump apparatus may be used as a concept that includes the refrigerating cycle apparatus. For example, the MHP apparatus 2 corresponds to a heating device that heats inside air by absorbing heat of outside air.

The RTM apparatus 2 includes a motor generator 20, a pump 30, a first magneto-caloric element unit 40, a second magneto-caloric element unit 50, a first shift 70, and a second shift 80. The motor generator 20 corresponds to a power source device (generator) that takes out (gains) magnetic force as kinetic energy when the RTM apparatus 2 works as the TME apparatus. The motor generator 20 corresponds to a power source (motor) that supplies power when the RTM apparatus 2 works as the MHP apparatus. The pump 30 pumps heat transport medium to flow.

The first magneto-caloric element unit 40 accommodates a magneto-caloric element 49, and further has a device for switching a magnetic field. The second magneto-caloric element unit 50 accommodates a magneto-caloric element 59, and further has a device for switching a magnetic field. The magneto-caloric element unit 40, 50 may be referred as a magnetic element unit. The magneto-caloric element is a magnetic substance (element).

When the RTM apparatus 2 works as the TME apparatus, the magneto-caloric element 49, 59 is used as a magnetic element 49, 59. When a temperature of the magneto-caloric element 49, 59 becomes equal to or higher than a Curie temperature, the magnetism of the magneto-caloric element 49, 59 decreases. In a typical example, the magneto-caloric element 49, 59 loses the magnetism.

The magnetism is regained when the temperature of the magneto-caloric element 49, 59 becomes lower than the Curie temperature. At this time, the magnetism increases, and the magneto-caloric element 49, 59 becomes to have strong magnetism again.

The magneto-caloric element 49, 59 generates heat when an external magnetic field is applied to the element 49, 59, and absorbs heat when the external magnetic field is removed from the element 49, 59. Hereinafter, the magneto-caloric element unit 40, 50 may be referred as MCD unit 40, 50.

The shift 70, 80 controls a rotation speed and/or a rotation phase between revolving shafts located on the both sides.

The RTM apparatus 2 supplies hot energy to a high temperature end 11, and supplies cold energy to a low temperature end 12. When the RTM apparatus 2 is operated, the temperature of the magneto-caloric element of the RTM apparatus 2 becomes high at the high temperature end 11, and becomes low at the low temperature end 12. The cold energy and the hot energy supplied by the RTM apparatus 2 are transported by heat transport medium using the pump 30. The heat transport medium may be water, for example. Hereinafter, the heat transport medium of the RTM apparatus 2 is referred as working water.

High-temperature working water flows out of the high temperature end 11, and the hot energy is supplied to outside. After the hot energy is supplied to outside, the working water returns to the high temperature end 11. At this time, cold energy is carried into the high temperature end 11.

Low-temperature working water flows out of the low temperature end 12, and the cold energy is supplied to outside. After the cold energy is supplied to outside, the working water returns to the low temperature end 12. At this time, hot energy is carried into the low temperature end 12.

The RTM apparatus 2 is equipped with the plural MCD units 40, 50 in this embodiment. The first MCD unit 40 located on the high temperature side supplies cold energy to a middle low temperature end 13 that is located at approximately middle between the high temperature end 11 and the low temperature end 12. The second MCD unit 50 located on the low temperature side supplies hot energy to a middle high temperature end 14 that is located at approximately middle between the high temperature end 11 and the low temperature end 12.

The first shift 70, the second shift 80, the pump 30 and the heat transport medium existing in the shift 70, 80 and the pump 30 are thermally combined with each other, between the middle low temperature end 13 and the middle high temperature end 14. Sufficient thermal binding is provided between the middle low temperature end 13 and the middle high temperature end 14 so as to define a predetermined temperature gradient between the high temperature end 11 and the low temperature end 12.

The air-conditioner 1 has a high temperature side circulation passage 15 that connects the RTM apparatus 2 to the indoor heat exchanger 3. Working water flowing through the high temperature passage 15 transmits heat to the indoor heat exchanger 3 from the RTM apparatus 2.

The air-conditioner 1 has a low temperature side circulation passage 16 that connects the RTM apparatus 2 to the outdoor heat exchanger 4. Working water flowing through the low temperature passage 16 transmits heat from the outdoor heat exchanger 4 to the RTM apparatus 2.

The air-conditioner 1 uses outside air as a main heat source. A thermal load of the air-conditioner 1 corresponds to inside air. Thus, the air-conditioner 1 corresponds to a heating device. The RTM apparatus 2 supplies the heat of the outdoor heat exchanger 4 corresponding to the main heat source to the indoor heat exchanger 3 corresponding to the thermal load.

The air-conditioner 1 includes a battery 5 (BATT). The battery 5 supplies electricity power to the motor generator 20 when the motor generator 20 works as a motor. The battery 5 stores electricity power supplied from the motor generator 20 when the motor generator 20 works as a generator.

The air-conditioner 1 has a control device (CNTR) 10. The control device 10 controls plural components of the air-conditioner 1 so as to switch the RTM apparatus 2 between the TME apparatus and the MHP apparatus. The control device 10 switches the motor generator 20 between the motor and the generator. Moreover, the control device 10 controls the first shift 70 and the second shift 80 to switch the state of the rotation speed and/or the rotation phase of the first shift 70 and the second shift 80.

When the RTM apparatus 2 works as the MHP apparatus, the control device 10 controls the motor generator 20 as the motor. Further, when the RTM apparatus 2 works as the MHP apparatus, the control device 10 controls the shift 70, 80 to have a predetermined relationship between the heat transport and the switch in the magnetic field.

When the RTM apparatus 2 works as the TME apparatus, the control device 10 controls the motor generator 20 as the generator. Further, when the RTM apparatus 2 works as the TME apparatus, the control device 10 controls the shift 70, 80 to have a predetermined relationship between the heat transport and the switch in the magnetic field.

The control device 10 controls the rotation of the pump 30 and the rotation of the MCD unit 40, 50 so as to perform the switching between the MHP apparatus and the TME apparatus. The rotation of the pump 30 realizes the heat transport, and the rotation of the MCD unit 40, 50 realizes the switch in the magnetic field. That is, the relationship between the rotation of the pump 30 and the rotation of the MCD unit 40, 50 is switched for switching the RTM apparatus 2 between the MHP apparatus and the TME apparatus.

The control device 10 switches the rotation speed and/or the rotation phase for the pump 30 and the MCD unit 40, 50. The control device 10 can generate a phase shift between the rotation of the pump 30 and the rotation of the MCD unit 40, 50 for the switching between the MHP apparatus and the TME apparatus. That is, the control device 10 causes a predetermined phase shift between the heat transport and the switch in the magnetic field. For example, the phase shift may be 90°, that is ¼ of a fluctuation period of the magnetic field. The phase shift is provided by the control device 10 and the shift 70, 80.

The control device 10 may be constructed by a microcomputer having a media that is readable by a computer. The media stores a program readable by a computer. The media may be a memory. The control device 10 works and functions to practice predetermined controls when the program is executed by the control device 10. The control device 10 may include a functional block or module.

Figure 2:
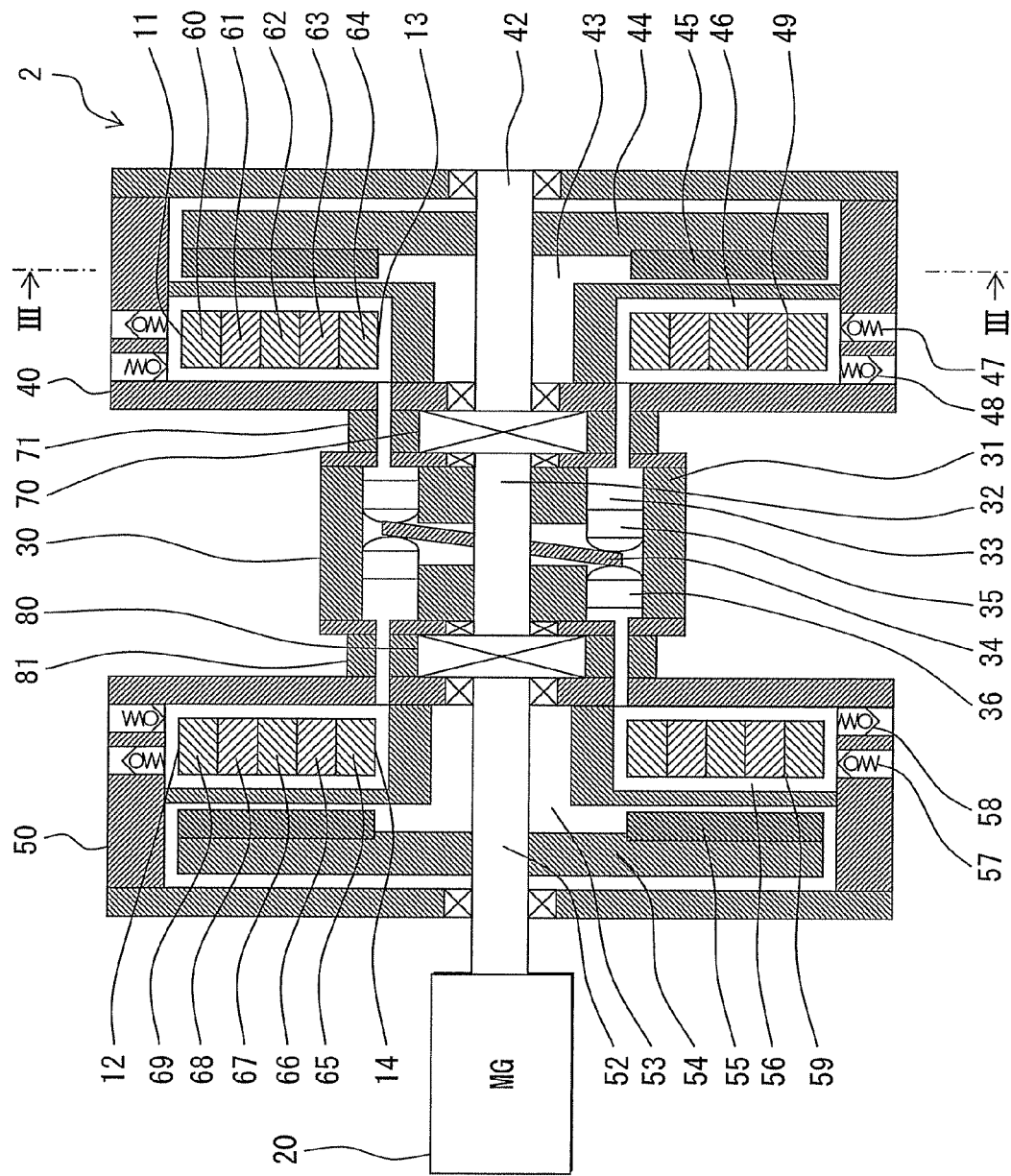
FIG. 2 is a sectional view illustrating the reversible thermo-magnetic cycle apparatus.
Figure 3:
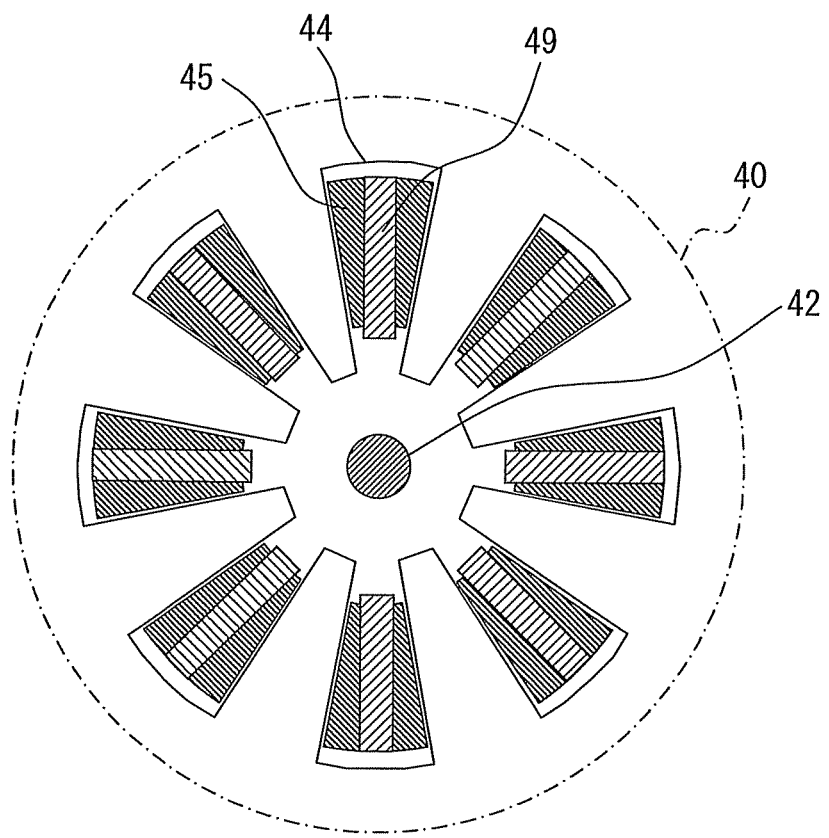
FIG. 3 is a plan view illustrating an arrangement of permanent magnet of the reversible thermo-magnetic cycle apparatus.

FIG. 2 is a schematic sectional view of the RTM apparatus 2. FIG. 3 is a plan view illustrating an arrangement of permanent magnet of the RTM apparatus 2, which is taken along a line III-III of FIG. 2. Specifically, FIG. 3 illustrates a plan view of a rotor core 44 and a permanent magnet 45. The magneto-caloric element 49 is also illustrated in FIG. 3 so as to show a position relationship between the permanent magnet 45 and the magneto-caloric element 49.

As shown in FIG. 2, the motor generator (MG) 20 is directly coupled to a revolving shaft 32 of the pump 30. Alternatively, the motor generator 20 may be directly coupled to a revolving shaft 42, 52 of the MCD unit 40, 50. When the RTM apparatus 2 works as the MHP apparatus, the motor generator 20 is rotated by electricity supplied from the battery 5, and the motor generator 20 drives the pump 30 and the MCD unit 40, 50. Thereby, the pump 30 generate a flow of the working water.

Moreover, the permanent magnet of the MCD unit 40, 50 is rotated. Thereby, the motor generator 20 and the MCD unit 40, 50 alternately switch a state of external magnetic field. That is, the external magnetic field is applied to the magneto-caloric element or is removed from the magneto-caloric element, and the switching is alternately performed by the motor generator 20 and the MCD unit 40, 50. The removal of the external magnetic field represents that no external magnetic field is applied to the magneto-caloric element.

When the RTM apparatus 2 works as the TME apparatus, the motor generator 20 is rotated by the MCD unit 40, 50, so that the motor generator 20 produces the power. The power generated by the motor generator 20 is supplied to a load. The load may be the battery 5, for example, and the battery 5 is charged with the power.

At this time, the MCD unit 40, 50 drives the pump 30, so that the pump 30 generates a flow of the working water. The temperature of the magneto-caloric element of the MCD unit 40, 50 is switched to be higher than the Curie temperature or to be lower than the Curie temperature. That is, the temperature of the magneto-caloric element is alternately switched between a temperature equal to or higher than the Curie temperature and a temperature lower than the Curie temperature.

The rotor core 44, 54 and the permanent magnet 45, 55 correspond to a magnetic-field applier device that applies an external magnetic field to the magneto-caloric element 49, 59. As a result, magnetic force is periodically generated between the magneto-caloric element 49, 59 and the permanent magnet 45, 55, so that the permanent magnet 45, 55 is rotated. Magnetic attraction force is periodically generated between the magneto-caloric element 49, 59 and the permanent magnet 45, 55, so that the permanent magnet 45, 55 is rotated.

The pump 30 generates two-direction flows of the working water in the MCD unit 40, 50, so that an active magnetic refrigeration (AMR) cycle can be provided by the magneto-caloric element. When the RTM apparatus 2 works as the MHP apparatus, the pump 30 produces a circulation flow of the working water, and the cold energy and/or the hot energy obtained from the MCD unit 40, 50 are supplied to outside. When the RTM apparatus 2 works as the TME apparatus, the pump 30 produces a circulation flow of the working water, and the cold energy and/or the hot energy obtained from outside is supplied to the magneto-caloric element of the MCD unit 40, 50.

The circulation flow represents a flow of working water flowing out of the MCD unit 40, 50 and again returning to the MCD unit 40, 50. The circulation flow may include a high temperature external circulation flow of the working water that flows out of the high temperature end 11, passes through the high temperature side circulation passage 15, and returns to the high temperature end 11 again. The circulation flow may include a low temperature external circulation flow of the working water that flows out of the low temperature end 12, passes through the low temperature side circulation passage 16, and returns to the low temperature end 12 again. In this embodiment, the pump 30 generates both of the low temperature external circulation flow and the high temperature external circulation flow.

The pump 30 is a positive-displacement two-direction pump. More specifically, the pump 30 may be a cam (swash) plate type piston pump. As shown in FIG. 2, the pump 30 has a cylindrical housing 31. The housing 31 supports the revolving shaft 32 rotatably at the center axis. The housing 31 partitions and defines at least one cylinder 33. For example, plural cylinders 33 are arranged around the revolving shaft 32 at equal intervals in a circumference direction. In this embodiment, the housing 31 partitions and defines, for example, eight cylinders 33.

The housing 31 accommodates a cam (swash) plate 34. The cam plate 34 is rotatably supported in the inclined state, that is, a predetermined angle is defined between the cam plate 34 and the center axis of the housing 31. The cam plate 34 is connected with the revolving shaft 32 and rotates with the revolving shaft 32.

Two pistons 35 and 36 are arranged in the respective cylinder 33. The cam plate 34 is located between the two pistons 35 and 36. One of the pistons 35 reciprocates in the right half of the cylinder 33, in FIG. 2. The other piston 36 reciprocates in the left half of the cylinder 33, in FIG. 2.

As a result, two-cylinder positive-displacement piston pump is defined in the respective cylinder 33. Volumes of the two cylinders are complementarily fluctuated. The two-cylinder simultaneously generates a flow flowing from the low temperature end 12 to the middle high temperature end 14 and a flow flowing from the middle low temperature end 13 to the high temperature end 11. Moreover, the two-cylinder simultaneously generates a flow flowing to the middle low temperature end 13 from the high temperature end 11 and a flow flowing to the low temperature end 12 from the middle high temperature end 14.

Because the housing 31 defines the eight cylinders 33, the pump 30 is a sixteen-cylinder piston pump. At another viewpoint, the two pistons 35, 36 oppose to each other through the cam plate 34, so that the pump 30 provides a first pump group located on the right side and a second pump group located on the left side, in FIG. 2. The first pump group is used for the first MCD unit 40. The second pump group is used for the second MCD unit 50.

The first MCD unit 40 and the second MCD unit 50 are located opposite from each other through the pump 30, and are symmetrically constructed and arranged relative to the pump 30. The first MCD unit 40 and the second MCD unit 50 construct one magneto-caloric device, as a whole, which supplies hot energy to the high temperature end 11, and supplies cold energy to the low temperature end 12.

The MCD unit 40, 50 has a cylindrical housing 41, 51. The housing 41, 51 supports the revolving shaft 42, 52 rotatably at the center axis. The housing 41, 51 partitions and defines a flat cylindrical magnet chamber 43, 53 around the revolving shaft 42, 52. The rotor core 44, 54 is fixed to the revolving shaft 42, 52, and is constructed to define alternately two areas in the circumference direction. A flux of magnetic induction easily passes in one of the areas, and is difficult to pass in the other area.

The rotor core 44, 54 has a shape of a petal or daisy in the cross-section which is perpendicular to the revolving shaft 42, 52. In this embodiment, the cross-section of the rotor core 44, 54 has eight sector shaped portions. A plurality of the permanent magnets 45, 55 is fixed to the rotor core 44, 54. The permanent magnet 45, 55 has a cylindrical surface, and the cross-section of the magnet 45, 55 has a sector (fan) shape in the cross-section which is perpendicular to the revolving shaft 42, 52, as shown in FIG. 3. The permanent magnet 45, 55 is fixed to the sector shaped portion of the rotor core 44, 54.

The rotor core 44, 54 and the permanent magnet 45, 55 define alternately two areas in the circumference direction. The external magnetic field provided by the permanent magnet 45, 55 is strong in one of the areas, and the external magnetic field provided by the permanent magnet 45, 55 is weak in the other area. Almost all of the external magnetic field is removed in the other area.

The rotor core 44, 54 and the permanent magnet 45, 55 rotate synchronizing with the rotation of the revolving shaft 42, 52, so that the area where the external magnetic field is strong and the area where the external magnetic field is weak rotate synchronizing with the rotation of the revolving shaft 42, 52. As a result, at one point around the rotor core 44, 54 and the permanent magnet 45, 55, a time period during which the external magnetic field is impressed strongly and a time period during which the external magnetic field becomes weak are repeatedly generated.

That is, the rotor core 44, 54 and the permanent magnet 45, 55 alternately repeat the impression and the removal of the external magnetic field, and correspond to a magnetic-field applying and removing device or a magnetic field switcher which alternately switches the impression and the removal of the external magnetic field relative to the magneto-caloric element 49, 59.

The magnetic field switcher may be equipped with the motor generator 20. The magnetic field switcher switches the impression and the removal of the external magnetic field relative to the magneto-caloric element 49, 59 by making the magneto-caloric element 49, 59 and the magnetic-field applying and removing device to have a relative movement relative to each other.

The magnetic field switcher may be equipped with the first permanent magnet 45 and the second permanent magnet 55. The first permanent magnet 45 is disposed in the first MCD unit 40, and switches the impression and the removal of the magnetic field relative to the first magneto-caloric element 49 by the rotation. The second permanent magnet 55 is arranged in the second MCD unit 50, and switches the impression and the removal of the magnetic field relative to the second magneto-caloric element 59 by the rotation.

The housing 41, 51 partitions and defines at least one work chamber 46, 56. The work chamber 46, 56 is located adjacent to the magnet chamber 43, 53. The housing 41, 51 partitions and defines a plurality of the work chambers 46, 56 arranged at equal intervals in the circumference direction and located on the lateral side of the magnet chamber 43, 53 in the radial direction. In this embodiment, the housing 41 partitions and defines, for example, eight work chambers 46, and the housing 51 partitions and defines, for example, eight work chambers 56.

The respective work chamber 46, 56 defines a pillar-shaped space. An axis direction of the space corresponds to the axis direction of the housing 41, 51. The respective work chamber 46, 56 is defined to correspond to only one cylinder 33. The work chamber 46 and the work chamber 56 are arranged to oppose with each other through the one cylinder 33 in the axis direction.

A radially-outer end of the respective work chamber 46 has a first gateway section through which the working water flows inward or outward. As shown in FIG. 2, the first gateway section has an exit 47 through which the working water is supplied to the indoor heat exchanger 3, and an inlet 48 which receives the working water returning from the indoor heat exchanger 3. A check valve is disposed in the exit 47, and permits only the outward flow of the working water from the work chamber 46. A check valve is disposed in the inlet 48, and permits only the inward flow of the working water into the work chamber 46. The check valve disposed in the exit 47 and the check valve disposed in the inlet 48 may be made of a lead valve or a ball valve.

A radially-inner end of the respective work chamber 46 has a second gateway section which communicates with the pump 30. The second gateway section communicates with only one pump chamber defined by the one cylinder 33 and the one piston 35.

A radially-outer end of the respective work chamber 56 has a first gateway section through which the working water flows inward or outward. The first gateway section has an exit 57 through which the working water is supplied to the outdoor heat exchanger 4, and an inlet 58 which receives the working water returning from the outdoor heat exchanger 4. A check valve is disposed in the exit 57, and permits only the outward flow of the working water from the work chamber 56. A check valve is disposed in the inlet 58, and permits only the inward flow of the working water into the work chamber 56. The check valve disposed in the exit 57 and the check valve disposed in the inlet 58 may be made of a lead valve or a ball valve.

A radially-inner end of the respective work chamber 56 has a second gateway section which communicates with the pump 30. The second gateway section communicates with only one pump chamber defined by the one cylinder 33 and the one piston 36.

The work chamber 46, 56 corresponds to a passage through which the working water passes as a refrigerant. Working water flows along the longitudinal direction of the work chamber 46, 56 in both inward and outward ways.

Furthermore, the work chamber 46, 56 provides an accommodation chamber accommodating the magneto-caloric element 49, 59. The housing 41, 51 provides a container defining the work chamber 46, 56. The magneto-caloric element 49, 59 is arranged in the work chamber 46, 56 as a magnetic element which has magneto-caloric effect.

When the external magnetic field is applied to the magneto-caloric element 49, 59, electron spins gather in the direction of the magnetic field. At this time, magnetic entropy decreases and the temperature is raised by emitting heat.

When the external magnetic field is removed from the magneto-caloric element 49, 59, the electron spins become to have disordered state. At this time, magnetic entropy increases and the temperature is lowered by absorbing heat.

The magneto-caloric element 49, 59 is made of magnetic substance which has a high magneto-caloric effect in an ordinary temperature region. The magnetism of the magnetic substance is rapidly decreased when the temperature of the magneto-caloric element 49, 59 exceeds the Curie temperature, and is rapidly raised when the temperature of the magneto-caloric element 49, 59 becomes lower than the Curie temperature. For example, the magneto-caloric element 49, 59 may be made of a gadolinium (Gd)-base material or lanthanum-iron-silicon compound. Alternatively, a mixture of manganese, iron, phosphorus, and germanium may be used.

The magneto-caloric element 49, 59 has a bar (stick) shape extending in the radial direction of the MCD unit 40, 50. The magneto-caloric element 49, 59 is shaped to sufficiently be able to exchange heat with the working water flowing through the work chamber 46, 56. The respective magneto-caloric element 49, 59 may be referred as an element bed.

In this embodiment, a magneto-caloric element disposed between the high temperature end 11 and the low temperature end 12 is constructed by the first magneto-caloric element 49 and the second magneto-caloric element 59. The first magneto-caloric element 49 is arranged in the first MCD unit 40, and has the high temperature end 11 and the middle low temperature end 13 opposite from each other. The middle low temperature end 13 and the high temperature end 11 oppose with each other through the first magneto-caloric element 49. The second magneto-caloric element 59 is arranged in the second MCD unit 50, and has the low temperature end 12 and the middle high temperature end 14 opposite from each other. The middle high temperature end 14 and the low temperature end 12 oppose with each other through the second magneto-caloric element 59.

The magneto-caloric element 49, 59 is influenced by the external magnetic field impressed or removed by the rotor core 44, 54 and the permanent magnet 45, 55. That is, in a case where the RTM apparatus 2 works as the MHP apparatus, when the revolving shaft 42, 52 rotates, the external magnetic field is alternately applied or removed. Thus, the magneto-caloric element 49, 59 is alternately magnetized or non-magnetized.

In a case where the RTM apparatus 2 works as the TME apparatus, the temperature of the magneto-caloric element 49, 59 is switched to be higher or lower than the Curie temperature so that the magnetism of the magneto-caloric element 49, 59 is alternately switched to become higher or lower relative to the Curie temperature. Thus, the revolving shaft 42, 52 is rotated by the magnetic force generated between the magneto-caloric element 49, 59 and the permanent magnet 45, 55.

The respective MCD unit 40, 50 has a plurality of magneto-caloric elements 49, 59 which is thermally connected in parallel. For example, five magneto-caloric elements 49 are thermally connected in parallel in the MCD unit 40, and five magneto-caloric elements 59 are thermally connected in parallel in the MCD unit 50. Further, the magneto-caloric elements 49, 59 of the first and second MCD units 40, 50 construct one magneto-caloric element by a thermally series connection.

As shown in FIG. 2, the respective magneto-caloric element 49 has plural element units 60, 61, 62, 63, 64 (hereinafter referred as 60-64). The plural element units 60-64 are arranged in the longitudinal direction of the magneto-caloric element 49, that is, along a flowing direction of the working water.

The respective magneto-caloric element 59 has plural element units 65, 66, 67, 68, 69 (hereinafter referred as 65-69). The plural element units 65-69 are arranged in the longitudinal direction of the magneto-caloric element 59, that is, along a flowing direction of the working water.

The plural element units 60-64 respectively have high magneto-caloric effects ΔS(J/kgK) in temperature zones different from each other. The plural element units 65-69 respectively have high magneto-caloric effects ΔS(J/kgK) in temperature zones different from each other.

The element unit 60 located most adjacent to the high temperature end 11 has a material composition to have a high magneto-caloric effect in a temperature range that is close to a temperature of the high temperature end 11 in an ordinary operation state. The element unit 64 located most adjacent to the middle low temperature end 13 has a material composition to have a high magneto-caloric effect in a temperature range that is close to a temperature of the middle low temperature end 13 in an ordinary operation state. The element unit 65 located most adjacent to the middle high temperature end 14 has a material composition to have a high magneto-caloric effect in a temperature range that is close to a temperature of the middle high temperature end 14 in an ordinary operation state. The element unit 69 located most adjacent to the low temperature end 12 has a material composition to have a high magneto-caloric effect in a temperature range that is close to a temperature of the low temperature end 12 in an ordinary operation state.

A temperature zone in which a high magneto-caloric effect is demonstrated is referred as efficient temperature zone. Upper limit temperature and lower limit temperature of the efficient temperature zone are dependent on, for example, the material composition of the magneto-caloric element 49. The plural element units 60-64 are arranged in series in a manner that the efficient temperature zones are aligned between the high temperature end 11 and the middle low temperature end 13 in order of temperature.

In other words, the efficient temperature zones of the plural element units 60-64 have a step-shaped distribution so as to be gradually lowered from the high temperature end 11 to the middle low temperature end 13. The step-shaped distribution of the efficient temperature zones approximately correspond to a temperature distribution defined between the high temperature end 11 and the middle low temperature end 13 in an ordinary operation state.

The plural element units 65-69 are arranged in series in a manner that the efficient temperature zones are aligned between the middle high temperature end 14 and the low temperature end 12 in order of temperature. In other words, the efficient temperature zones of the plural element units 65-69 have a step-shaped distribution so as to be gradually lowered from the middle high temperature end 14 to the low temperature end 12. The step-shaped distribution of the efficient temperature zones approximately correspond to a temperature distribution defined between the middle high temperature end 14 and the low temperature end 12 in an ordinary operation state.

Furthermore, the plural element units 60-64, 65-69 are arranged in series in a manner that the efficient temperature zones are aligned between the high temperature end 11 and the low temperature end 12 in order of temperature. In other words, the efficient temperature zones of the plural element units 60-64, 65-69 have a step-shaped distribution between the high temperature end 11 and the low temperature end 12. The step-shaped distribution of the efficient temperature zones approximately correspond to a temperature distribution defined between the high temperature end 11 and the low temperature end 12 in an ordinary operation state.

Figure 4:
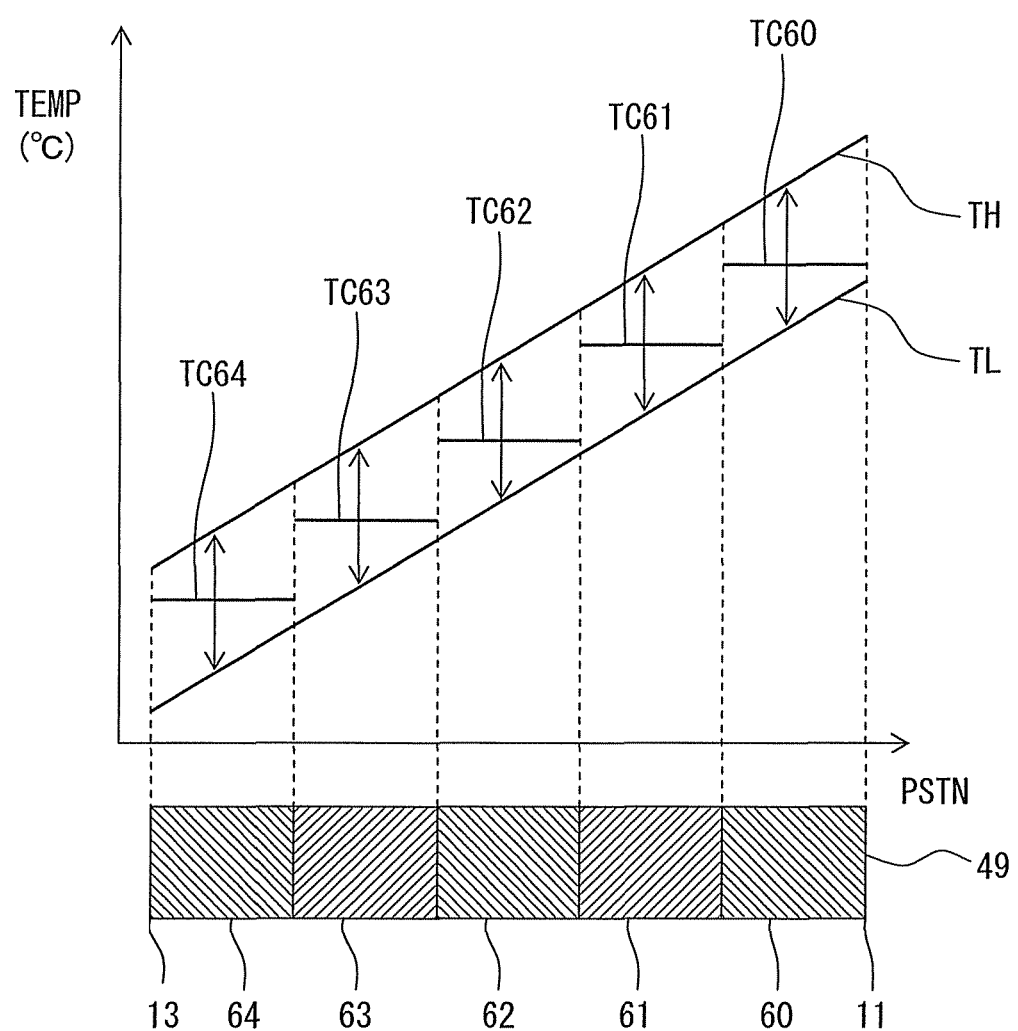
FIG. 4 is a graph illustrating a distribution of Curie temperature in a magneto-caloric element of the reversible thermo-magnetic cycle apparatus.

FIG. 4 is a graph illustrating temperature distribution of the magneto-caloric element 49 and distribution of Curie temperature TC. In FIG. 4, an axis of abscissa represents a position (PSTN) in the magneto-caloric element, and an axis of ordinate represents a temperature (TEMP).

The magneto-caloric element 49 has the distribution of Curie temperature that corresponds to the temperature distribution defined between the high temperature end and the low temperature end. The materials respectively constructing the plural element units 60-64, 65-69 have Curie temperatures different from each other.

The plural element units 60-64, 65-69 are arranged in series between the high temperature end 11 and the low temperature ends 12, in a manner that the Curie temperatures are aligned in order of the temperature between the high temperature end 11 and the low temperature end 12.

In other words, the Curie temperatures of the plural element units 60-64, 65-69 represent a step(stair)-shaped distribution, as shown in FIG. 4. The arrangement of the Curie temperatures approximately corresponds to the temperature distribution between the high temperature end 11 and the low temperature end 12 when the RTM apparatus 2 is operated as the TME apparatus.

The respective Curie temperature of the element unit 60-64, 65-69 is set between a heat temperature TH and a cool temperature TL at the position of the element unit. The element unit is defined to have the heat temperature TH when the element unit is heated. The element unit is defined to have the cool temperature TH when the element unit is cooled.

Thereby, in a case where the RIM apparatus 2 is operated as the TME apparatus, if the temperature of the element unit 60-69 is slightly raised by the heat transport from the high temperature end 11 to the middle low temperature end 13, the temperature of the element unit 60-69 exceeds the Curie temperature TC, so that the magnetism of the element unit 60-69 is lowered. In contrast, if the temperature of the element unit 60-69 is slightly lowered by the heat transport to the high temperature end 11 from the middle low temperature end 13, the temperature of the element unit 60-69 becomes lower than the Curie temperature TC, so that the magnetism of the element unit 60-69 is again made stronger.

In the example of FIG. 4, the element unit 60 located near the high temperature end 11 has a Curie temperature TC60 which is close to or slightly lower than a temperature of the high temperature end 11, in the case where the RTM apparatus 2 is operated as the TME apparatus. The Curie temperature TC60 of the element unit 60 is set between the heat temperature TH and the cool temperature TL in an area where the element unit 60 is disposed.

The element unit 64 located near the middle low temperature end 13 has a Curie temperature TC64 which is close to or slightly higher than a temperature of the middle low temperature end 13, in the case where the RTM apparatus 2 is operated as the TME apparatus. The Curie temperature TC64 of the element unit 64 is set between the heat temperature TH and the cool temperature TL in an area where the element unit 64 is disposed.

The magneto-caloric element 59 has a distribution of the Curie temperature, similarly to FIG. 4, which shows the case of the magneto-caloric element 49.

As shown in FIG. 2, the first shift 70 is disposed between the revolving shaft 32 of the pump 30 and the revolving shaft 42 of the first MCD unit 40. The first shift 70 controls the rotation speed and/or the rotation phase between the revolving shaft 32 and the revolving shaft 42.

The second shift 80 is disposed between the revolving shaft 32 of the pump 30 and the revolving shaft 52 of the second MCD unit 50. The second shift 80 controls the rotation speed and/or the rotation phase between the revolving shaft 32 and the revolving shaft 52.

The motor generator 20 is connected to the revolving shaft 52 of the second MCD unit 50, for example. The first shift 70 and the second shift 80 control the rotation relationship among the revolving shaft 32 of the pump 30, the revolving shaft 42 of the first MCD unit 40, and the revolving shaft 52 of the second MCD unit 50, so as to realize the AMR cycle.

A passage portion 71 is arranged between the pump 30 and the first MCD unit 40, and defines a passage for the working water. The one cylinder 33 and the one work chamber 46 communicate with each other through the passage defined by the passage portion 71.

A passage portion 81 is arranged between the pump 30 and the second MCD unit 50, and defines a passage for the working water. The one cylinder 33 and the one work chamber 56 communicate with each other through the passage defined by the passage portion 81.

A plurality of RTM units is constructed by the first MCD unit 40 and the multi-cylinder piston pump defined in the right half of the pump 30. Specifically, eight RTM units are constructed. The plurality of RTM units is thermally connected in parallel.

A plurality of RTM units is constructed by the second MCD unit 50 and the multi-cylinder piston pump defined in the left half of the pump 30. Specifically, eight RTM units are constructed. The plurality of RTM units is thermally connected in parallel.

Further, the plurality of RTM units located on the right side of the pump 30 and the plurality of RTM units located on the left side of the pump 30 are thermally connected in series.

Operation of the air-conditioner 1 will be described. When the motor generator 20 is rotated, the revolving shaft 52 is rotated. The rotor core 54 and the permanent magnet 55 are rotated by the rotation of the revolving shaft 52. Thereby, the external magnetic field is alternately applied to or removed from the plural magneto-caloric elements 59.

The rotation of the revolving shaft 52 is transmitted to the revolving shaft 32 of the pump 30 through the second shift 80. When the revolving shaft 32 is rotated, the cam plate 34 is rotated. When the cam plate 34 is rotated, a radially outside portion of the cam plate 34 moves in the axis direction, and the piston 35 and the piston 36 reciprocate in the axis direction. At this time, the volume of the cylinder 33 fluctuates. The working water flows out of the cylinder 33 or flows into the cylinder 33 in accordance with a change in the volume of the cylinder 33.

The piston 36 increases or decreases the volume of the left half of the cylinder 33. When the piston 36 reciprocates, two-direction flows of the working water are generated in the work chamber 56. When the working water flows toward the low temperature end 12 from the middle high temperature end 14, the cold energy of the magneto-caloric element 59 is transported toward the low temperature end 12 from the middle high temperature end 14. Furthermore, a part of the working water existing near the low temperature end 12 flows into the low temperature side circulation passage 16 through the exit 57. The working water of the low temperature side circulation passage 16 passes through the outdoor heat exchanger 4. At this time, the working water is heated by outside air. That is, the working water cools the outside air. When the working water flows toward the middle high temperature end 14 from the low temperature end 12, the hot energy of the magneto-caloric element 59 is transported toward the middle high temperature end 14 from the low temperature end 12. At this time, the working water flows into the work chamber 56 from the low temperature side circulation passage 16.

Furthermore, the rotation of the revolving shaft 32 is transmitted to the revolving shaft 42 of the MCD unit 40 through the first shift 70. When the revolving shaft 42 is rotated, the rotor core 44 and the permanent magnet 45 are rotated. Thereby, the external magnetic field is alternately applied to or removed from the plural magneto-caloric elements 49.

The piston 35 increases or decreases the volume of the right half of the cylinder 33. When the piston 35 reciprocates, two-direction flows of the working water are generated in the work chamber 46. When the working water flows toward the high temperature end 11 from the middle low temperature end 13, the hot energy of the magneto-caloric element 49 is transported toward the high temperature end 11 from the middle low temperature end 13. Furthermore, a part of the working water existing near the high temperature end 11 flows into the high temperature side circulation passage 15 through the exit 47. The working water of the low temperature side circulation passage 15 passes through the indoor heat exchanger 3. At this time, the working water heats inside air. That is, the working water is cooled by the inside air. When the working water flows toward the middle low temperature end 13 from the high temperature end 11, the cold energy of the magneto-caloric element 49 is transported toward the middle low temperature end 13 from the high temperature end 11. At this time, the working water flows into the work chamber 46 from the high temperature side circulation passage 15.

The second shift 80 causes the rotation of the revolving shaft 52 and the rotation of the revolving shaft 32 to synchronize with each other so as to realize the AMR cycle by a combination of the switch in the external magnetic field for the second MCD unit 50 and the switch in the flow of the working water by the pump 30.

The first shift 70 causes the rotation of the revolving shaft 42 and the rotation of the revolving shaft 32 to synchronize with each other so as to realize the AMR cycle by a combination of the switch in the external magnetic field for the first MCD unit 40 and the switch in the flow of the working water by the pump 30.

Figure 5A:
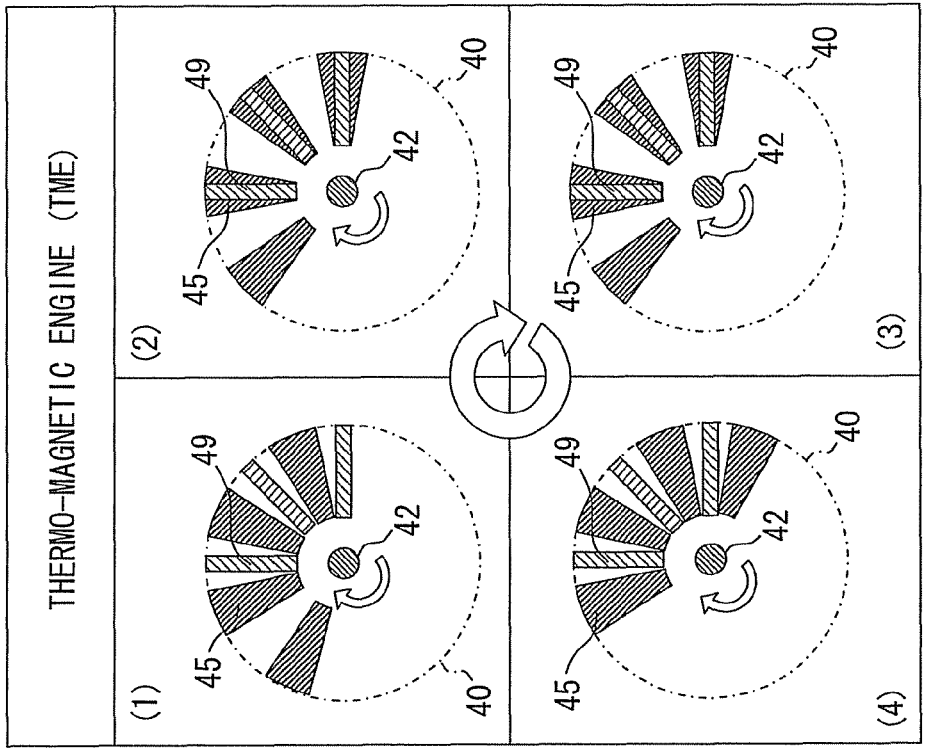
FIG. 5A is a state transition view of the reversible thermo-magnetic cycle apparatus as a magneto-caloric effect heat pump.
Figure 5B:
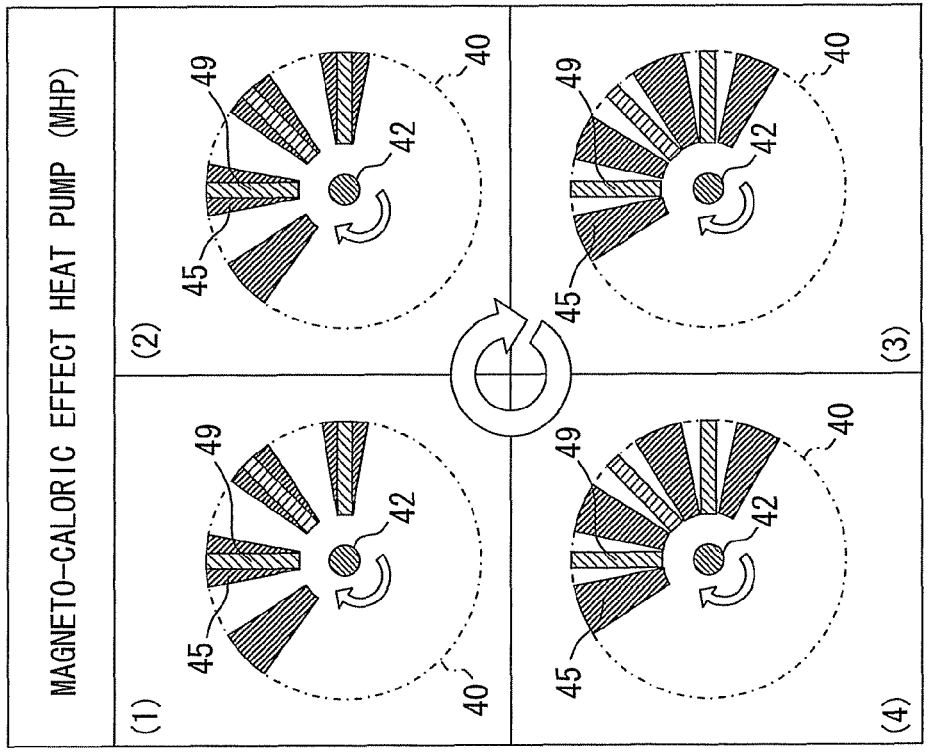
FIG. 5B is a state transition view of the reversible thermo-magnetic cycle apparatus as a thermo-magnetic engine.

FIG. 5A is a state transition view of the RTM apparatus 2 operating as the MHP apparatus, and FIG. 5B is a state transition view of the RTM apparatus 2 operating as the TME apparatus. In FIGS. 5A and 5B, the permanent magnet 45 and the magneto-caloric element 49 are partially illustrated.

The control device 10 is a determiner that determines whether the RTM apparatus 2 is operated as the MHP apparatus or the TME apparatus. The determination may be performed in accordance with a state of the heat source. Alternatively, the determination may be performed through an input portion such as a switch that is operated by a user of the RTM apparatus 2. Thus, the operation state of the RTM apparatus 2 has a transition between FIG. 5A and FIG. 5B.

When the RTM apparatus 2 is operated as the MHP apparatus, the control device 10 is a controller that controls the RTM apparatus 2 to work as the MHP apparatus. The controller activates the motor generator 20 as the motor, and the controls the shift 70, 80 for the MHP apparatus.

When the RTM apparatus 2 is operated as the TME apparatus, the control device 10 is a controller that controls the RTM apparatus 2 to work as the TME apparatus. The controller activates the motor generator 20 as the generator, and the controls the shift 70, 80 for the TME apparatus.

When the RTM apparatus 2 works as the MHP apparatus, the AMR cycle is realized by the switch in the external magnetic field between the applying and the removal and the switch in the flow of the working water. The switch in the external magnetic field and the switch in the flow of the working water are combined so as to repeat the following four processes (1), (2), (3) and (4). The combination can be obtained by controlling the shift 70, 80. FIG. 5A illustrates a transition in the position relationship between the permanent magnet 45 and the magneto-caloric element 49 in the AMR cycle. Due to the AMR cycle, heat is transported stepwise and gradually, so that high efficiency can be obtained in the heat transport.

(1) Impress the external magnetic field to the magneto-caloric element 49, 59 using the magnetic-field applier device 44, 45, 54, 55.

(2) Flow the working water using the pump 30 from the low temperature end 12, 13 toward the high temperature end 14, 11 in a period during which the magnetic field is impressed.

(3) Remove the external magnetic field from the magneto-caloric element 49, 59 by controlling the magnetic-field applier device 44, 45, 54, 55.

(4) Flow the working water using the pump 30 from the high temperature end 11, 14 toward the low temperature end 13, 12 in a period during which the magnetic field is removed.

When the four processes (1), (2), (3) and (4) are repeated by the left half of the pump 30 and the MCD unit 50, the cold energy generated by the magneto-caloric effect is transported toward the low temperature end 12, and the hot energy generated by the magneto-caloric effect is transported toward the middle high temperature end 14. At this time, the magneto-caloric element 59 and the working water serve as a heat reservoir in which the hot energy and cold energy are stored.

When the above-mentioned processes are repeated, the inside of the work chamber 56 serves as a heat reservoir having a temperature gradient, and the temperature gradient gradually becomes large. Finally, in the ordinary operation status, a big temperature difference is generated between the low temperature end 12 and the middle high temperature end 14. The hot energy transported to the middle high temperature end 14 is further transmitted to the first MCD unit 40 via the second shift 80, the pump 30, and the first shift 70.

When the four processes (1), (2), (3) and (4) are repeated by the right half of the pump 30 and the MCD unit 40, the cold energy generated by the magneto-caloric effect is transported toward the middle low temperature end 13, and the hot energy generated by the magneto-caloric effect is transported toward the high temperature end 11. At this time, the magneto-caloric element 49 and the working water serve as a heat reservoir in which the hot energy and cold energy are stored.

When the above-mentioned processes are repeated, the inside of the work chamber 46 serves as a heat reservoir having a temperature gradient, and the temperature gradient gradually becomes large. Finally, in the ordinary operation status, a big temperature difference is generated between the middle low temperature end 13 and the high temperature end 11. The cold energy transported to the middle low temperature end 13 is further transmitted to the second MCD unit 50 via the first shift 70, the pump 30, and the second shift 80.

Thus, in this embodiment, the pump 30 pumps the working water toward the high temperature end 11 from the low temperature end 12, when the external magnetic field is impressed to the magneto-caloric element 49, 59. When the external magnetic field is removed from the magneto-caloric element 49, 59, the heat transport medium is pumped toward the low temperature end 12 from the high temperature end 11.

Furthermore, when the pump 30 pumps the working water toward the high temperature end 11 from the low temperature end 12, the working water is discharged to the high temperature side circulation passage 15 from the high temperature end 11, and the working water is drawn from the low temperature side circulation passage 16 to the low temperature end 12.

Furthermore, when the pump 30 pumps the working water toward the low temperature end 12 from the high temperature end 11, the working water is discharged to the low temperature side circulation passage 16 from the low temperature end 12, and the working water is drawn from the high temperature side circulation passage 15 to the high temperature end 11.

If an attention is paid only to the first MCD unit 40, the pump 30 discharges the working water to the high temperature side circulation passage 15 from the high temperature end 11, when the working water flows toward the high temperature end 11 from the middle low temperature end 13. Furthermore, the pump 30 draws the working water from the high temperature side circulation passage 15 to the high temperature end 11, when the working water flows toward the middle low temperature end 13 from the high temperature end 11.

If an attention is paid only to the second MCD unit 50, the pump 30 discharges the working water to the low temperature side circulation passage 16 from the low temperature end 12, when the working water flows toward the low temperature end 12 from the middle high temperature end 14. Furthermore, the pump 30 draws the working water from the low temperature side circulation passage 16 to the low temperature end 12, when the heat transport medium flows toward the middle high temperature end 14 from the low temperature end 12.

The MCD unit 40, the pump 30, and the MCD unit 50 function as a series of the MHP apparatus. As a result, a big temperature gradient arises between the low temperature end 12 and the high temperature end 11. The low-temperature working water flowing out of the low temperature end 12 absorbs heat from outside air in the outdoor heat exchanger 4, and supplies the heat to the low temperature end 12 by returning to the low temperature end 12 again. The MHP apparatus pumps up the heat supplied to the low temperature end 12 to the high temperature end 11. The high-temperature working water flowing out of the high temperature end 11 supplies the heat to inside air in the indoor heat exchanger 3, and receives heat from the high temperature end 11 by returning to the high temperature end 11 again.

When the RTM apparatus 2 works as the TME apparatus, an inverted AMR cycle is realized by the switch in the external magnetic field between the applying and the removal and the switch in the flow of the working water. The switch in the external magnetic field and the switch in the flow of the working water are combined so as to repeat the following four processes (1), (2), (3) and (4). The combination can be obtained by controlling the shift 70, 80. FIG. 5B illustrates a transition in the position relationship between the permanent magnet 45 and the magneto-caloric element 49 in the inverted AMR cycle. Due to the inverted AMR cycle, heat is transported stepwise and gradually, so that high efficiency can be obtained in the heat transport.

(1) The permanent magnet 45, 55 and the magneto-caloric element 49, 59 attract with each other due to the magnetic force of the permanent magnet 45, 55, so that the revolving shaft 42, 52 is rotated.

(2) Flow of the working water using the pump 30 toward the low temperature end 13, 12 from the high temperature end 11, 14, so that the magneto-caloric element 49, 59 is heated.

(3) The permanent magnet 45, 55 and the magneto-caloric element 49, 59 do not attract with each other, and the revolving shaft 42, 52 is rotated by inertial force.

(4) Flow the working water using the pump 30 from the low temperature end 12, 13 to the high temperature end 14, 11, so that the magneto-caloric element 49, 59 is cooled.

In the initial time when the RTM apparatus 2 is operated as the TME apparatus, the control device 10 controls the motor generator 20 to work as the motor. Thereby, the initial torque is provided by the motor generator 20, and the rotation direction can be made stable.

When the four processes (1), (2), (3) and (4) are repeated by the left half of the pump 30 and the MCD unit 50, the cold energy taken out from outside by the outdoor heat exchanger 4 is transported from the low temperature end 12 to the middle high temperature end 14. The cold energy transported to the middle high temperature end 14 is transmitted to the MCD unit 40 via the shift 70, the pump 30 and the shift 80. The hot energy is transported from the MCD unit 40 via the shift 70, the pump 30 and the shift 80 toward the middle high temperature end 14, and is transported to the low temperature end 12.

While the pump 30 pumps the two-direction flows, the temperature of the respective element unit 65-69 is alternately raised to be higher than the Curie temperature or lowered to be lower than the Curie temperature. The temperature variation in the respective element unit 65-69 is smaller than a temperature variation generated between the low temperature end 12 and the middle high temperature end 14. Therefore, the magnetism of the magneto-caloric element 59 is, as a whole, alternately lowered or raised by the small temperature difference.

The variation in the magnetism of the magneto-caloric element 59 periodically fluctuates the magnetic force generated between the permanent magneto 55 and the magneto-caloric element 59. As a result, rotation torque is generated in the permanent magnet 55, and the revolving shaft 52 rotates. The rotation of the revolving shaft 52 is transmitted to the motor generator 20. The motor generator 20 converts the rotation of the revolving shaft 52 to electricity power so as to charge the battery 5.

When the four processes (1), (2), (3) and (4) are repeated by the right half of the pump 30 and the MCD unit 40, the hot energy taken out from inside air by the indoor heat exchanger 3 is transported from the high temperature end 11 to the middle low temperature end 13. The hot energy transported to the middle low temperature end 13 is transmitted to the MCD unit 50 via the shift 70, the pump 30 and the shift 80. The cold energy is transported from the MCD unit 50 via the shift 70, the pump 30 and the shift 80 toward the middle low temperature end 13, and is transported to the high temperature end 11.

While the pump 30 pumps the two-direction flow, the temperature of the respective element unit 60-64 is alternately raised to be higher than the Curie temperature or lowered to be lower than the Curie temperature. The temperature variation in the respective element unit 60-64 is smaller than a temperature variation generated between the high temperature end 11 and the middle low temperature end 13. Therefore, the magnetism of the magneto-caloric element 49 is, as a whole, alternately lowered or raised by the small temperature difference.

The variation in the magnetism of the magneto-caloric element 49 periodically fluctuates the magnetic force generated between the permanent magneto 45 and the magneto-caloric element 49. As a result, rotation torque is generated in the permanent magnet 45, and the revolving shaft 42 rotates. The rotation of the revolving shaft 42 is transmitted to the motor generator 20. The motor generator 20 converts the rotation of the revolving shaft 42 to electricity power so as to charge the battery 5.

Thus, the pump 30 pumps the working water from the low temperature end 12 toward the high temperature end 11, and the magneto-caloric element 49, 59 is cooled so as to have strong magnetism. The pump 30 pumps the working water from the high temperature end 11 toward the low temperature end 12, and the magneto-caloric element 49, 59 is heated so as to lower or lose the magnetism.

The MCD unit 40, the pump 30, and the MCD unit 50 function as a series of the TME apparatus. As a result, kinetic energy can be taken out using the temperature difference between the low temperature end 12 and the high temperature end 11.

According to the first embodiment, the RTM apparatus 2 can be used as both of the TME apparatus and the MHP apparatus by switching. Further, the temperature difference between the low temperature end 12 and the high temperature end 11 can be effectively used in the TME apparatus.

The pump pumps the heat transport medium from the high temperature end to the low temperature end when the magnetic element is heated. The pump pumps the heat transport medium from the low temperature end to the high temperature end when the magnetic element is cooled. Therefore, the magnetic element has a temperature distribution corresponding to a temperature difference between the high temperature end and the low temperature end. As a result, heat transport can be efficiently performed. The temperature of the magnetic element is switched between the heat temperature and the cool temperature by the flow of the heat transport medium. The variation in the temperature of the magnetic element causes at least a part of the magnetic element to have a temperature higher than the Curie temperature and a temperature lower than the Curie temperature. That is, the magnetism of the at least a part of the magnetic element is lowered and raised. The variation in the magnetism causes a change in the magnetic force generated between the magnetic element and the magnetic-field applier device. The magnetic-field applier device and the power source device gains the change in the magnetic force as a kinetic energy.

The temperature of the magnetic element is raised to the heat temperature while the magnetic element has the temperature distribution, so that most part of the magnetic element has a temperature higher than the Curie temperature. Similarly, the temperature of the magnetic element is lowered to the cool temperature while the magnetic element has the temperature distribution, so that most part of the magnetic element has a temperature lower than the Curie temperature. As a result, the magnetism of the most part of the magnetic element is lowered and raised.

(Second Embodiment)

Figure 6:
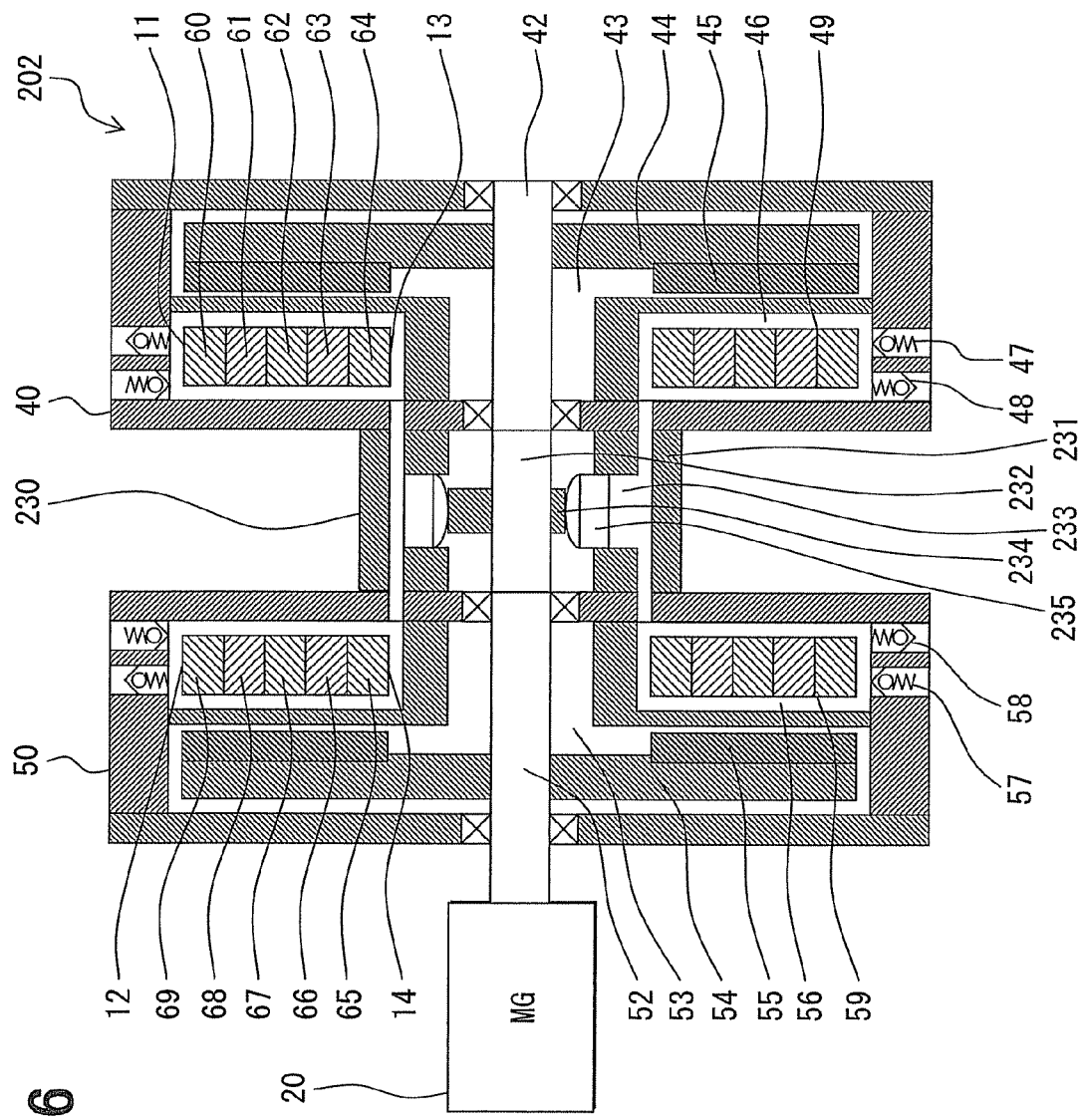
FIG. 6 is a sectional view illustrating a reversible thermo-magnetic cycle apparatus according to a second embodiment.

FIG. 6 is a schematic sectional view illustrating an RTM apparatus 202 according to a second embodiment. The RTM apparatus 202 is used in the air-conditioner 1, instead of the RTM apparatus 2 of the first embodiment. While the pump 30 is constructed of the swash plate pump in the first embodiment, a pump 230 of the second embodiment is constructed of a radial piston pump. Further, in the second embodiment, two work chambers 46, 56 are connected to correspond to one capacity-variable chamber.

The pump 230 has a cylindrical housing 231. The housing 231 supports a revolving shaft 232 rotatably at the center axis. The revolving shaft 232 is directly connected to the revolving shaft 42 and the revolving shaft 52. The housing 231 partitions and defines at least one cylinder 233. The housing 231 partitions and defines plural cylinders 233 arranged at equal intervals, around the revolving shaft 232. For example, the housing 231 partitions and defines eight cylinders 233.

The housing 231 accommodates a cam 234. The cam 234 has a cam surface on the outer circumference surface. The cam 234 is coupled to the revolving shaft 232 to rotate with the revolving shaft 232. One piston 235 is arranged in the respective cylinder 233. The piston 235 reciprocates in the cylinder 233 in the radial direction. As a result, one-cylinder positive-displacement piston pump is defined in the respective cylinder 233. Because the housing 231 has the eight cylinders 233, the pump 230 provides an eight-cylinder piston pump.

The pump 230 produces parallel flows of the working water for the first MCD unit 40 and the second MCD unit 50, due to a group of chambers. One cylinder simultaneously generates a flow flowing from the low temperature end 12 toward the middle high temperature end 14 and a flow flowing from the middle low temperature end 13 toward the high temperature end 11. Further, one cylinder simultaneously generates a flow flowing from the high temperature end 11 toward the middle low temperature end 13 and a flow flowing from the middle high temperature end 14 toward the low temperature end 12.

The pump 230 discharges the working water from the high temperature end 11 to the high temperature side circulation passage 15 when the working water flows from the middle low temperature end 13 toward the high temperature end 11. Further, the pump 230 discharges the working water from the low temperature end 12 to the low temperature side circulation passage 16 when the working water flows from the middle high temperature end 14 toward the low temperature end 12.

The pump 230 draws the working water to the high temperature end 11 from the high temperature side circulation passage 15 when the working water flows toward the middle low temperature end 13 from the high temperature end 11. Further, the pump 230 draws the working water to the low temperature end 12 from the low temperature side circulation passage 16 when the working water flows toward the middle high temperature end 14 from the low temperature end 12.

According to the second embodiment, the plural work chambers 46, 56 are provided to correspond to one positive-displacement chamber. While the RTM apparatus 202 is used as the MHP apparatus, when the external magnetic field is applied to one of the chambers 46, the external magnetic field is not applied to the other chamber 56. As a result, the magneto-caloric element 49 emits heat in the chamber 46, and the hot energy is transported. Simultaneously, the magneto-caloric element 59 absorbs heat in the chamber 56, and the cold energy is transported.

Further, the control device 10 conducts the phase shift between the heat transport and the switch in the magnetic field by 90° (=¼ of the period) so as to perform the switching between the MHP apparatus and the TME apparatus. The phase shift is achieved by the control cam of the pump 230. The mechanical construction realizing the predetermined phase shift is provided by the control device 10 and the driving mechanism of the pump 230.

(Other Embodiments)

The present disclosure is not limited to the above embodiments.

The air-conditioner 1 may be a cooling device that absorbs heat of inside air and emits the heat to outside air, instead of the heating device. In this case, the low-temperature side heat exchanger 4 is located inside of the vehicle, and the high-temperature side heat exchanger 3 is located outside of the vehicle.

The RTM apparatus 2 is not limited to have the above construction, that is, the MCD units 40, 50 are not limited to oppose each other through the pump 30. Alternatively, the RTM apparatus 2 may be constructed by a half of the pump 30 and one of the MCD units 40, 50. For example, the MHP apparatus may be constructed by the right half of the pump 30 and the MCD unit 40. In this case, the outdoor heat exchanger 4 may be arranged between the pump 30 and the MCD unit 40.

The magnetic-field applier device is not limited to be defined by the rotation of the permanent magnet. Alternatively, the magnetic-field applier device may be defined by a movement of the magneto-caloric element. Further, an electromagnet may be used instead of the permanent magnet.

The heat transport medium is not limited to the working water, and may have a first medium and a second medium. The first medium is used for defining the AMR cycle with the electro-caloric element 49, 59. The second medium is used for transporting heat between the RTM apparatus 2 and the heat exchanger 3, 4. The first medium and the second medium may be separated from each other. For example, a water circulation circuit and a pump are additionally arranged to transport the heat between the high temperature end 11 and the indoor heat exchanger 3, other than the RTM apparatus 2.

The multi-cylinder pump is provided by the swash plate pump or the radial piston pump in the above description. Alternatively, other positive-displacement pump may be used as the pump.

One work chamber 46, 56 is arranged to correspond to one cylinder of the pump in the first embodiment. Alternatively, the arrangement may be performed in a manner that plural cylinders correspond to one work chamber, that one cylinder corresponds to plural work chambers, or that plural cylinders correspond to plural work chambers.

Because the magneto-caloric element 49, 59 is made of an assembly of the plural element units 60-64, 65-69, the step-shaped distribution of the Curie temperature is realized so as to approximately correspond to the temperature distribution between the high temperature end 11 and the low temperature end 12. Alternatively, the Curie temperature may have a continuous distribution by continuously changing the material composition of the magneto-caloric element 49, 59 between the high temperature end 11 and the low temperature end 12.

Further, the whole of the magneto-caloric element 49, 59 may be made of a material having the same Curie temperature. With this construction, the magnetism of the magneto-caloric element is varied between a heat time when the element is heated and a cool time when the element is cooled, so that the magnetic force generated between the magneto-caloric element and the permanent magnet is changed. Thus, the rotating force can be taken out. Also in this case, the Curie temperature of the magneto-caloric element 49, 59 is set between the temperature of the high temperature end 11 and the temperature of the low temperature end 12.

The magneto-caloric element 49, 59 has the shape enabling sufficient heat exchange with the working water flowing through the work chamber 46, 56. More specifically, for example, a magneto-caloric element 49 shown in FIG. 7 may be used in the first and second embodiments.

Figure 7:
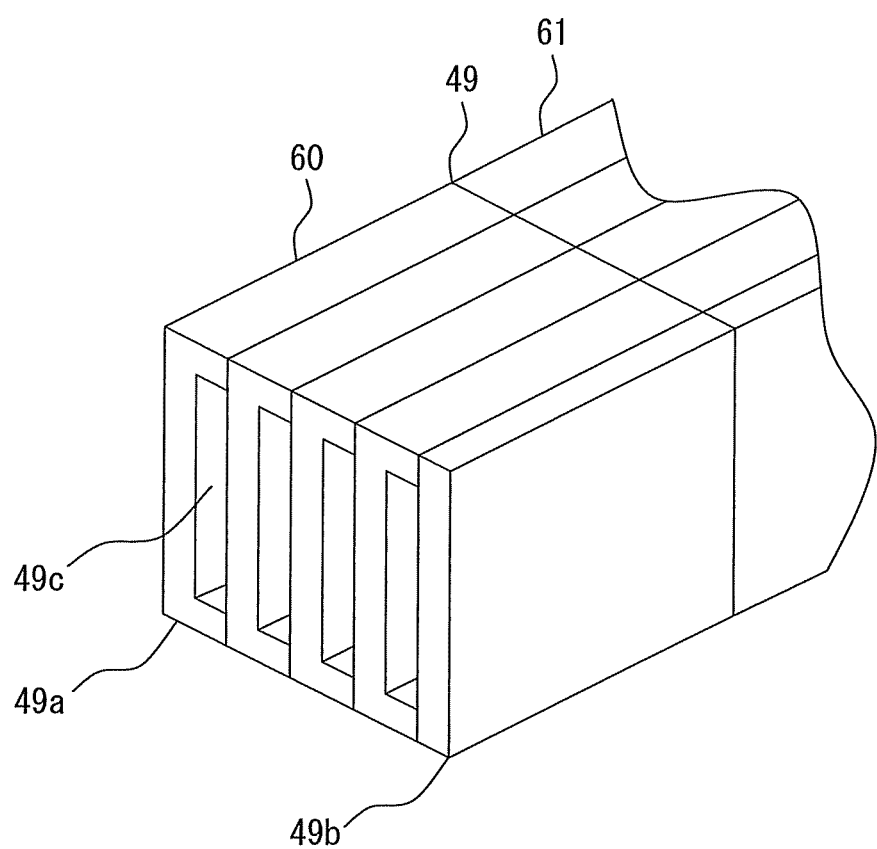
FIG. 7 is a schematic perspective view illustrating a magneto-caloric element that is applicable for the first and second embodiments.

As shown in FIG. 7, the magneto-caloric element 49 has a square column shape, and is constructed by layering plural board members 49a, 49b. The board member 49a has a groove 49c that defines a passage for the working water. The board member 49b is located on the end in the layering direction, and has no groove. Alternatively, the magneto-caloric element may be constructed by layering only the same board members having the same shape. The magneto-caloric element 49 has plural passages inside, for the working water. The plural passages facilitate the heat exchange between the element 49 and the working water. The passage is defined between the board members 49a, 49b located adjacent with each other. The magneto-caloric element 59 may have the similar structure as the magneto-caloric element 49.

The RTM apparatus may be used for an air-conditioner in a residence instead of the vehicle.

The main heat source may be water or sand, other than the outside air. Further, waste heat of the vehicle may be used as a heat source. For example, waste heat of the engine, waste heat of an inverter of an electric car, or waste heat of a motor may be used.

Means and functions of the control device 10 may be provided by only software, only hardware or a combination of the software and the hardware. For example, the control device may be made of an analogue circuit.

Such changes and modifications are to be understood as being within the scope of the present disclosure as defined by the appended claims.

What is claimed is:

1. A thermo-magnetic engine apparatus comprising:
   a magnetic element having a high temperature end to which hot energy is supplied and a low temperature end to which cold energy is supplied, the magnetic element having a Curie temperature set between a temperature of the high temperature end and a temperature of the low temperature end, a magnetism of the magnetic element decreasing when a temperature of the magnetic element is equal to or higher than the Curie temperature and increasing when the temperature of the magnetic element is lower than the Curie temperature;
   a pump pumping heat transport medium toward the low temperature end from the high temperature end when the magnetic element is heated and pumping the heat transport medium toward the high temperature end from the low temperature end when the magnetic element is cooled;
   a magnetic-field applier that applies and removes an external magnetic field to the magnetic element; and a power source that gains magnetic power generated between the magnetic element and the magnetic-field applier as kinetic energy; wherein the magnetic element generates heat when an external magnetic field is applied to the magnetic element and absorbing heat when the external magnetic field is removed from the magnetic element to form a magneto-caloric element;

the power source switches the external magnetic field between the applying of the external magnetic field and the removal of the external magnetic field by causing the magneto-caloric element and the magnetic-field applier to have a relative movement to form a magnetic field switcher; and the pump pumping the heat transport medium from the low temperature end toward the high temperature end when the external magnetic field is applied to the magneto-caloric element and pumping the heat transport medium from the high temperature end toward the low temperature end when the external magnetic field is removed from the magneto-caloric element.

2. The thermo-magnetic engine apparatus according to claim 1, wherein the magnetic element has a distribution of the Curie temperature that corresponds to a temperature distribution defined between the high temperature end and the low temperature end, and the pump switches a flow direction of the heat transport medium so that the magnetic element alternately has a temperature equal to or higher than the Curie temperature or a temperature lower than the Curie temperature.

3. The thermo-magnetic engine apparatus according to claim 1, further comprising:

a low-temperature heat exchanger that exchanges heat with a heat source supplying the cold energy;

a low-temperature circulation passage passing through the low-temperature heat exchanger;

a high-temperature heat exchanger that exchanges heat with a heat source supplying the hot energy; and a high-temperature circulation passage passing through the high-temperature heat exchanger, wherein the pump discharges the heat transport medium to the high-temperature circulation passage from the high-temperature end when the heat transport medium flows from the low-temperature end to the high-temperature end, the pump draws the heat transport medium from the high-temperature circulation passage to the high-temperature end when the heat transport medium flows from the high-temperature end to the low-temperature end, the pump discharges the heat transport medium to the low-temperature circulation passage from the low-temperature end when the heat transport medium flows from the high-temperature end to the low-temperature end, and the pump draws the heat transport medium from the low-temperature circulation passage to the low-temperature end when the heat transport medium flows from the low-temperature end to the high-temperature end.

4. The thermo-magnetic engine apparatus according to claim 1, wherein the magneto-caloric element has a plurality of element units each of the element units having efficient temperature ranges different from each other, each of the element units having high magneto-caloric effect in the efficient temperature range, and the plurality of element units are arranged in series between the high temperature end and the low temperature end in a manner that the efficient temperature ranges are aligned in order of temperature.

5. The thermo-magnetic engine apparatus according to claim 1, wherein the pump has a phase for heat transport, the magnetic-field applier device or the magnetic field switcher has a phase for magnetic-field variation, and the phase for heat transport and the phase for magnetic-field variation are set to have a predetermined phase shift from each other so as to switch the reversible thermo-magnetic cycle apparatus between the thermo-magnetic engine apparatus and the magneto-caloric effect type heat pump apparatus.

6. The thermo-magnetic engine apparatus according to claim 1, further comprising:

a low temperature heat exchanger exchanging heat with a first heat source;

a low temperature circulation circuit extending from the pump to the low temperature heat exchanger and from the low temperature heat exchanger to the pump;

a high temperature heat exchanger exchanging heat with a second heat source different than the first heat source; and a high temperature circulation circuit extending from the pump to the high temperature heat exchanger and from the high temperature heat exchanger to the pump, the high temperature circulation circuit being separate from the low temperature circulation circuit.

7. The thermo-magnetic engine apparatus according to claim 1, wherein the thermo-magnetic engine apparatus generates power.

8. The thermo-magnetic engine apparatus according to claim 1, wherein the power source device is a motor generator.

9. The thermo-magnetic engine apparatus according to claim 2, wherein the magnetic element has a plurality of element units that respectively have Curie temperatures different from each other, and the plurality of element units are arranged in series between the high temperature end and the low temperature end in order of the Curie temperatures.

10. The thermo-magnetic engine apparatus according to claim 3, wherein the magnetic element includes a first magneto-caloric element arranged in a first element unit, the first magneto-caloric element having the high temperature end and a middle low temperature end opposite from the high temperature end, and a second magneto-caloric element arranged in a second element unit, the second magneto-caloric element having the low temperature end and a middle high temperature end opposite from the low temperature end, the magnetic-field applier device includes a first permanent magnet arranged in the first element unit, the first permanent magnet applying the external magnetic field for the first magneto-caloric element, and a second permanent magnet arranged in the second element unit, the second permanent magnet applying the external magnetic field for the second magneto-caloric element, the pump discharges the heat transport medium to the high-temperature circulation passage from the high temperature end when the heat transport medium flows from the middle low temperature end to the high temperature end in the first element unit, the pump draws the heat transport medium from the high-temperature circulation passage to the high temperature end when the heat transport medium flows from the high temperature end to the middle low temperature end in the first element unit, the pump discharges the heat transport medium to the low-temperature circulation passage from the low temperature end when the heat transport medium flows from the middle high temperature end to the low temperature end in the second element unit, and the pump draws the heat transport medium from the low-temperature circulation passage to the low temperature end when the heat transport medium flows from the low temperature end to the middle high temperature end in the second element unit.

11. The thermo-magnetic engine apparatus according to claim 6, wherein the low temperature circulation circuit does not extend through the high temperature heat exchanger.

12. The thermo-magnetic engine apparatus according to claim 6, wherein the high temperature circulation circuit does not extend through the low temperature heat exchanger.

13. The thermo-magnetic engine apparatus according to claim 11, wherein the high temperature circulation circuit does not extend through the low temperature heat exchanger.

14. The thermo-magnetic engine apparatus according to claim 7, wherein the power is electrical power.

* * * * *